United States Patent Office 2,705,701
Patented Apr. 5, 1955

2,705,701

METHOD FOR PREPARING MAGNETIC COMPOSITIONS

Henry L. Crowley, South Orange, N. J., assignor, by mesne assignments, to Henry L. Crowley & Company, Inc., West Orange, N. J., a corporation of New Jersey No Drawing. Application November 28, 1952, Serial No. 323,145

9 Claims. (Cl. 252—62.5)

This invention relates to magnetic compositions and articles formed therefrom, and has for its object the provision of certain improvements in methods of making the same. More particularly, the invention contemplates certain improvements in those methods of making magnetic compositions in which a metal oxide mixture containing 50 to 90% by weight of ferric oxide and one or more other metal oxides is subjected to multi-stage heat-treatment including prefiring and final-firing at temperatures within the range of 800 to 1500° C. The invention more specifically involves certain improvements in the preparation of the product of the pre-firing or first stage heat-treatment for the last or final stage of heat-treatment in such methods of making magnetic compositions. Throughout this specification and the appended claims "magnetic composition" means the final and finished composition and includes articles made therefrom.

Magnetic compositions, commonly known as ferrites, are prepared by subjecting to two or more stages of heat-treatment a mixture of ferric oxide and one and usually two or more divalent oxides of metals other than iron and capable of modifying the magnetic or electrical or both properties of the composition. In accordance with one common method of procedure, each stage of heat-treatment is carried out in an atmosphere of air or in an oxygen atmosphere to avoid any oxygen loss in the ferrite. My United States Letters Patent 2,575,099 describes a different method of preparing magnetic compositions from similar metal oxide mixtures characterized in that the environments in which the initial oxide mixture and the pre-fired product are respectively heat-treated are so controlled that ferrous oxide is present in the product resulting at the conclusion of final-firing, and that product is gradually cooled through at least the greater part of the temperature range in which ferrous oxide spontaneously dissociates into metallic iron and magnetite.

In the preparation of magnetic compositions of the types contemplated by the present invention, the first and last stages of heat-treatment are frequently spoken of as pre-firing and final-firing, respectively, and are commonly carried out at temperatures within the range of 800 to 1500° C., and more usually of 1000 to 1450° C. The initial oxide mixture may be subjected to the first heat-treatment in granular (i. e. finely divided) form, or it may be agglomerated, with the aid of a suitable binder if desired. Preferably, the initial oxide mixture is de-aerated, compacted and densified, preparatory to pre-firing, in accordance with the principles described in my Patent No. 2,703,787.

The product of the first heat-treatment, after grinding to the desired fine particle size, is compacted and pressed into shaped articles of the shape and size predetermined by the shape and size of the final article (e, g, a magnetic core), due allowance being made for shrinkage during the second heat-treatment. The shaped articles are then subjected to final-firing, and, when made in accordance with the method of patent 2,575,099, are gradually cooled as hereinbefore mentioned.

I have discovered that the electrical, magnetic and physical properties of the magnetic composition can be usefully enhanced, as well as beneficially controlled, by selectively sizing the finely ground product of pre-firing to give the greatest possible packing density in compacting and pressing into shaped articles for final-firing. The beneficial effects of such selective sizing are more pronounced when the initial oxide mixture is deaerated and compacted into dense shapes, preparatory to pre-firing, as described in my Patent No. 2,703,787, and the present invention, in its preferred aspect, accordingly involves selective sizing of the finely-ground product of pre-firing the thus-compacted and dense shapes. In its broader aspect, the invention contemplates preparing from the finely-ground pre-fired product a selectively-sized powder of which approximately one half (or slightly less) by weight is of a particle size between 5 and 10 microns, about one-quarter (or slightly more) by weight is of a particle size between 10 and 40 microns and the balance is of a particle size up to 5 microns and preferably between 1 to 5 microns. The selectively-sized powder is formed into densely-packed shaped articles and the shaped articles are subjected to final-firing in any of the aforementioned methods of making magnetic compositions.

In practicing the present invention in conjunction with the invention of my Patent No. 2,703,787, the initial oxide mixture is compacted and densified under considerable pressure after and preferably while the mixture is subjected to a relatively high vacuum. Compacting may be done by pressure alone, as for example by briquetting in a mold or press, by extrusion, or by pressure followed by extrusion, all under evacuated conditions. A very considerable pressure is used in compacting, since the purpose is to densify the deaerated mixture as greatly as possible. To this end, a compacting pressure of at least 5000 pounds per square inch is employed, and preferably the compacting pressure is about 20,000 to 40,000 pounds per square inch. Compacting and densifying may advantageously be carried out by extruding the deaerated mixture in the form of bars or rods approximately one-half (½) inch in diameter under a pressure approximating 20,000 pounds per square inch. The extruded bars break off in lengths of about 3 to 4 inches, suitable for handling before, during and following pre-firing.

Prior to compacting, the initial oxide mixture is subjected to a relatively high vacuum, sufficient to substantially deaerate the mixture, so that the compacted and densified mixture is substantially devoid of air pores. The high vacuum should be maintained during compacting to avoid re-entrance of air into any of the already evacuated pores of the mixture. In practice, it is usually preferable to carry out the steps of evacuation and compacting simultaneously. The vacuum should be as high as practical, and of the order of at least 25 inches of mercury, and preferably as high as 28 inches of mercury, and even higher if practical.

In compacting and densifying the deaerated initial oxide mixture, it is desirable to incorporate therein a binder and sufficient moisture to impart plasticity. Where pre-firing is conducted under conditions promoting the removal of some, but not all, of the oxygen content of the ferric oxide component of the initial oxide mixture, the binder may advantageously be a carbonaceous material capable of additionally serving as a reducing agent such, for example, as dextrin, starch, flour, cellulosic substances etc., and may be added in amounts of from about 1 to 5% by weight of the initial oxide mixture. A moisture (water) content of about 10% by weight usually imparts the desired amount of plasticity to the mixture. The deaerated and densely compacted shapes are dried in any suitable manner, as for example in an oven at a temperature slightly above 100° C. to eliminate moisture, and are then pre-fired.

At the conclusion of the pre-firing or first-stage heat-treatment, particularly when conducted in a reducing environment, the heat-treated shapes are preferably quenched to minimize dissociation of ferrous oxide into metallic iron and magnetite, since the presence of magnetic materials is detrimental in the subsequent grinding operations. Quenching is conveniently effected by directly discharging the heat-treated product from the furnace into water. The quenched product is then crushed and ground to a relatively fine powder.

Grinding is carried out to enable selective sizing of the ground product in accordance with the characteristic principles of the present invention. The aim of such selective sizing is to produce a powder in which the relatively coarse and relatively fine particles are so proportioned as to give the greatest possible packing density. Particles of 1 micron and smaller in size are undesirable, since they present too great surface areas and tend to chemically impair the magnetic composition. On the other hand, too large a proportion of particles above 10 to 15 microns in size is undesirable. The most favorable distribution of particle size in the ground powder for compacting and pressing into shaped articles for final firing is as follows:

| Particle size in microns: | Percent by weight |
|---|---|
| 1–5 | 35–25 |
| 5–10 | 40–50 |
| 10–15<br>15–20<br>20–40 | 25 |

The 25% by weight of the 10 to 40 micron portion is preferably made up of about three equal amounts by weight of the 10–15 micron, 15–20 micron and 20–40 micron portions, respectively. Thus, only about 8% by weight of the finely ground and selectively-sized powder is of a particle size exceeding 20 microns, and only about 17% is of a particle size exceeding 15 microns. When the binder (customarily mixed with the powder for compacting and pressing into shaped articles) contains a wax-like lubricant as hereinafter mentioned, a larger proportion of the coarser particles may be tolerated, say 20% of the 10–15 micron particles and 20% of the 15–40 micron particles, with 40% of the 5–10 micron particles and 20% of the finer particles up to 5 microns and preferably between 1 and 5 microns.

In practicing the invention, the pre-fired product is ground to give as near as practical a powder having this characteristic distribution of particle size. Since this requires very careful grinding control, and even then is difficult of attainment, an alternative practical and convenient procedure is to blend powders of known particle size ranges. For example, one portion (A) of the pre-fired product is ground to a size as uniform as possible to produce a ground product of which 75% by weight is of a particle size between 2 and 6 microns. Another portion (B) of the pre-fired product is ground, as uniformly as possible, to produce a ground product having an average particle size of 25 microns, or alternatively until at least 90% by weight of the ground product is of a particle size between 10 and 40 microns. 75% by weight of ground product A is then blended with 25% by weight of ground product B to produce a blended powder of the contemplated particle size distribution having excellent packing density.

Particle size determinations may conveniently be made with a Cenco-Sheard-Sanford Photelometer, obtained from the Central Scientific Company, of Chicago. The determinations are made by allowing a portion of the ground product to settle through a transparent liquid of known viscosity and depth. A beam of light is passed through the liquid and a photoelectric cell arrangement records the amount of light passed in a given time. As the particles settle through the liquid they interrupt the light. Since the particles settle in accordance with Stokes law, the amount of light that is cut off during a given time period is correlated to the percentage of particles of a certain particle size or within a particular range of particle size.

In plant practice it is customary to make a particle size determination of a representative sample from each grind of the pre-fired product. Where this determination shows that the ground product does not meet the required particle size distribution, the product may be further ground, or it may be set aside for blending. By properly blending different grinds of known particle size distribution, a powder of the characteristic particle size distribution of the invention is readily obtained.

The powder, selectively-sized in accordance with the invention, is compacted and pressed into shaped articles with the aid of an appropriate binder. I have found that the binder should be composed of three parts, one for imparting a lubricating quality during pressing, the second for imparting initial moist plasticity, and the third for imparting green strength to the shaped articles. The lubricating part is preferably a wax-like material, and may advantageously be compounded by heating a mixture of 6 parts by weight of stearic acid and 4 parts of triethanolamine to approximately 190° F. until a clear melted liquid (straw color) is obtained, and while held at 190° F. adding 15 parts of tricresyl phosphate. During cooling of the wax-like reaction product, sufficient water is added so that when the complete binder is mixed with the powder a moist, plastic mass is obtained. The water constitutes the second part of the binder, and the amount required is generally of the order of 10% on the weight of the powder with which the complete binder is to be mixed. To the cooled mixture of wax-like reaction product and water is added 4 to 8 parts by weight (calculated on a dry basis) of an organic resin, such for example as a phenol formaldehyde resin. The resin is preferably added in liquid form, as an aqueous solution when water-soluble or in an organic solvent such as an alcohol, a ketone etc. About 2 pounds (on a dry basis) of the complete binder is mixed with each 100 pounds of the selectively-sized powder, mixing being conveniently carried out in a dough-type mixer. The resulting mixture may advantageously be dried in the mixer, or in an oven at a temperature of about 220° F., to eliminate the water. The dried material is easily granulated and flows readily into the press cavities. The fluidity needed for pressing is maintained since the residual plasticizer and resin do not vaporize at the drying temperature. In final-firing the non-resinous part of the binder vaporizes easily and rapidly within the temperature range of 400 to 600° F. The resinous part of the binder imparts green strength, both as pressed and while heating up to relatively low temperatures, and also supplies the carbonaceous reducing agent contemplated during final-firing in the method of my Patent 2,575,099. The carbonaceous residue should be kept to the required minimum, since more than required for the contemplated reduction is difficult to burn out. Hence, the amount of resin (on a dry basis) mixed with the selectively-sized powder (in the form of the aforementioned complete binder) is about 0.25% to about 0.5% by weight.

Shaped articles produced in accordance with the principles of the invention possess superior mechanical and physical properties. This is in large part due to the high packing density of the selectively-sized powder of which the shaped articles are formed. Additionally such shaped articles have improved shrinking properties during final-firing. Moreover, practice of the invention, especially in its preferred and complete aspect, results in far greater uniformity of the finally-fired shaped articles. Thus, by the practice of the invention, rejects are reduced from around 50%, heretofore common in plant practice, to around 2%, and often to none, and usually the reasons for rejection are chips and minor physical imperfections occasioned in the course of ordinary handling. The invention also makes possible more advantageous and more predictable control of the physical and electrical properties of the finally-fired shaped articles. It has been found in practice that the electrical properties of the finished articles are greatly influenced by the soundness of structure, and when this soundness of structure is uniformly controlled, the electrical properties are more uniform and more predictable. The invention permits very accurate control of shrinkage during final firing. Not only can the shrinkage be substantially less than heretofore common in plant practice, but it can be controlled to meet various requirements.

Because of the influence that shrinkage exerts on the physical and electrical properties of the finished article, the ability to control shrinkage is of particular importance and advantage in plant practice. Not only is such control conducive to better uniformity of product, but it enables desirable adjustments in certain processing procedures and the attainment of optimum shrinkage for particular articles. For example, pressures of the order of 25,000 pounds per square inch have heretofore been customary in forming shaped articles for final-firing, and shrinkage during final-firing is about 15%. Formed under the same pressure, shaped articles made in accordance with the present invention may shrink during final-firing less than 5%, and even as little as 1 to 2%. Alternatively, where a predetermined shrinkage during final-firing is desired, a very considerably lower forming pressure may be employed with selectively-sized powders of the invention. Thus, using existing dies designed for a shrinkage of 15% during final firing, a forming pressure of only 5,000 pounds per square inch is required with selectively-sized powders of the invention, as contrasted with the heretofore customary forming pressure of 25,000 pounds per square inch.

Some magnetic articles are made of two or more separate pieces, such, for example, as the conventional E-clamp in which two pieces, each of E-shape, are fitted together to form a closed magnetic core. The electrical properties of the composite article are determined by (a) the intrinsic electrical properties of each piece, and (b) the degree of tightness with which the pieces are fitted together, since even relatively small air gaps between the two pieces have a serious effect on the electrical properties of the composite article. Accordingly, in making separate pieces which are to be fitted together to form a composite article, a controlling consideration is the tightness of the fit that can be obtained. If shrinkage during final-firing of such pieces is of the order of 10 to 15%, even small variations in shrinkage control will result in objectionable lack of mechanical uniformity with attendant serious impairment of the electrical properties of the composite article. Even if such pieces do possess intrinsically good electrical properties, the electrical properties of the composite article are likely to be poor because the chances of obtaining an unsatisfactory fit are greater as the degree of shrinkage increases. The best results are obtained in making such composite articles by controlling shrinkage to a low degree, say 1 to 2%, with some slight sacrifice in the intrinsic electrical properties, and practice of the present invention makes this possible. On the other hand, many articles are finally-fired in their complete form, e. g. a cylindrical core around which a coil of wire is to be wound, and in making such articles some shrinkage is not only unobjectionable but beneficially effects the electrical properties of the article. The present invention by promoting control of shrinkage and uniformity of product, facilitates processing and final-firing of such articles to give the optimum shrinkage, say around 15%, for the best electrical properties.

I claim:

1. In a method of preparing a magnetic composition in which an initial oxide mixture containing at least 50% by weight of ferric oxide and at least one other metal oxide is subjected to heat-treatment in multi-stages including pre-firing and final-firing at temperatures within the range of 800 to 1500° C., the improvement which comprises grinding the pre-fired product to a relatively fine powder, preparing from the finely-ground pre-fired product a selectively-sized powder of which from about 40% to about 50% by weight is of a particle size between 5 and 10 microns, from about 35% to about 20% by weight is of a particle size up to 5 microns, and from about 40% to about 25% by weight is of a particle size between 10 and 40 microns, forming said selectively-sized powder into densely-packed shaped articles, and subjecting said articles to final-firing at a temperature within the aforementioned range.

2. In a method of preparing a magnetic composition according to claim 1 in which the selectively-sized powder is made up of about 40% by weight of particle sizes between 5 and 10 microns, about 40% by weight of particle sizes between 10 and 40 microns and about 20% by weight of particle sizes up to 5 microns.

3. In a method of preparing a magnetic composition according to claim 2 in which about half of the 40% portion of particle sizes between 10 and 40 microns is of a particle size between 10 and 15 microns.

4. In a method of preparing a magnetic composition in which an initial oxide mixture containing at least 50% by weight of ferric oxide and at least one other metal oxide is subjected to heat-treatment in multi-stages including pre-firing and final-firing at temperatures within the range of 800 to 1500° C., the improvement which comprises grinding the pre-fired product to a relatively fine powder, preparing from the finely-ground pre-fired product a selectively-sized powder of which approximately one-half by weight is of a particle size between 5 and 10 microns, about one-quarter by weight is of a particle size larger than 10 microns but not larger than about 40 microns, and the balance is of a particle size smaller than 5 microns but not smaller than about 1 micron, forming said selectively-sized powder into densely-packed shaped articles, and subjecting said articles to final-firing at a temperature within the aforementioned range.

5. In a method of preparing a magnetic composition in which an initial oxide mixture containing at least 50% by weight of ferric oxide and at least one other metal oxide is subjected to heat-treatment in multi-stages including pre-firing and final-firing at temperatures within the range of 800 to 1500° C., the improvement which comprises grinding the pre-fired product to a relatively fine powder, preparing from the finely-ground pre-fired product a selectively-sized powder characterized by the following particle size distribution: 35–25% by weight of a particle size between 1 and 5 microns, 40–50% by weight of a particle size between 5 and 10 microns, 25% by weight of a particle size between 10 and 40 microns, forming said selectively-sized powder into densely-packed shaped articles, and subjecting said articles to final-firing at a temperature within the aforementioned range.

6. In a method of preparing a magnetic composition according to claim 5 further characterized in that the particle size distribution in the 25% portion of particle sizes between 10 and 40 microns is made up of about three equal parts by weight whose respective particle sizes are (1) between 10 and 15 microns, (2) between 15 and 20 microns, and (3) between 20 and 40 microns.

7. In a method of preparing a magnetic composition in which an initial oxide mixture containing at least 50% by weight of ferric oxide and at least one other metal oxide is subjected to heat-treatment in multi-stages including prefiring and final-firing at temperatures within the range of 800 to 1500° C., the improvement which comprises compacting the intimately mixed initial oxide mixture into dense shapes under a pressure of at least 5,000 pounds per square inch while maintained under a relatively high vacuum, subjecting the compacted dense shapes to pre-firing at a temperature within the aforementioned range, grinding the resulting pre-fired product to a relatively fine powder, prior to final-firing preparing from the finely-ground pre-fired product a selectively-sized powder of which from about 40% to about 50% by weight is of a particle size between 5 and 10 microns, from about 35% to about 20% by weight is of a particle size up to 5 microns, and from about 40% to about 25% by weight is of a particle size between 10 and 40 microns, forming said selectively-sized powder into densely-packed shaped articles, and subjecting said articles to final-firing at a temperature within the aforementioned range.

8. In a method of preparing a magnetic composition according to claim 7 in which the selectively-sized powder is made up of about 40% by weight of particle sizes between 5 and 10 microns, about 40% by weight of particle sizes between 10 and 40 microns and about 20% by weight of particle sizes up to 5 microns.

9. In a method of preparing a magnetic composition according to claim 8 in which about half of the 40% portion of particle sizes between 10 and 40 microns is of a particle size between 10 and 15 microns.

References Cited in the file of this patent

UNITED STATES PATENTS

| | | |
|---|---|---|
| 2,283,925 | Harvey | May 26, 1942 |
| 2,575,099 | Crowley | Nov. 13, 1951 |

OTHER REFERENCES

Goetzel, "Treatise on Powder Metallurgy," Interscience Pub. Inc., New York (1949), vol. 1, pp. 83, 87, 103–105, 124 (Copy in Div. 3.)